United States Patent [19]

Coxwell

[11] Patent Number: 5,033,227
[45] Date of Patent: Jul. 23, 1991

[54] FISHING DEVICE

[76] Inventor: Henry P. Coxwell, 1416 Manotak Ave., Jacksonville, Fla. 32210

[21] Appl. No.: 597,381

[22] Filed: Oct. 12, 1990

[51] Int. Cl.$^5$ ............................................. A01K 97/02
[52] U.S. Cl. ..................................... 43/44.99; 43/44.9
[58] Field of Search .................. 43/44.99, 44.91, 44.9, 43/42.06

[56] References Cited

U.S. PATENT DOCUMENTS

| | | | |
|---|---|---|---|
| 2,612,718 | 10/1952 | Steinberg | 43/44.99 X |
| 2,719,382 | 10/1955 | Schachte | 43/44.99 |
| 2,928,202 | 3/1960 | Smerke | 43/44.99 X |
| 3,083,492 | 4/1963 | Kling | 43/44.99 X |
| 3,780,467 | 12/1973 | Lueck | 43/44.9 X |
| 3,953,934 | 5/1976 | Visser | 43/44.99 X |
| 4,065,870 | 1/1978 | Muko | 43/44.99 |
| 4,930,245 | 6/1990 | Bazzano | 43/44.99 X |

Primary Examiner—Richard K. Seidel
Assistant Examiner—Patty E. Hong
Attorney, Agent, or Firm—Thomas C. Saitta

[57] ABSTRACT

A fishing bobber which releases chum when cast into the water, the bobber comprising a buoyant main body to hold the chum, this main body having a main opening covered by a closure lid. The closure lid is maintained in place by a line member which extends through a tubular opening in the main body, the line member being of greater length than the main body, thus allowing the closure lid to separate from the main body and release the chum. The line member is connected to the cast line and the closure lid is connected to the weighted hook line, so that in the water the buoyancy of the main body and the pull of the hook line on the closure lid cause them to separate.

16 Claims, 1 Drawing Sheet

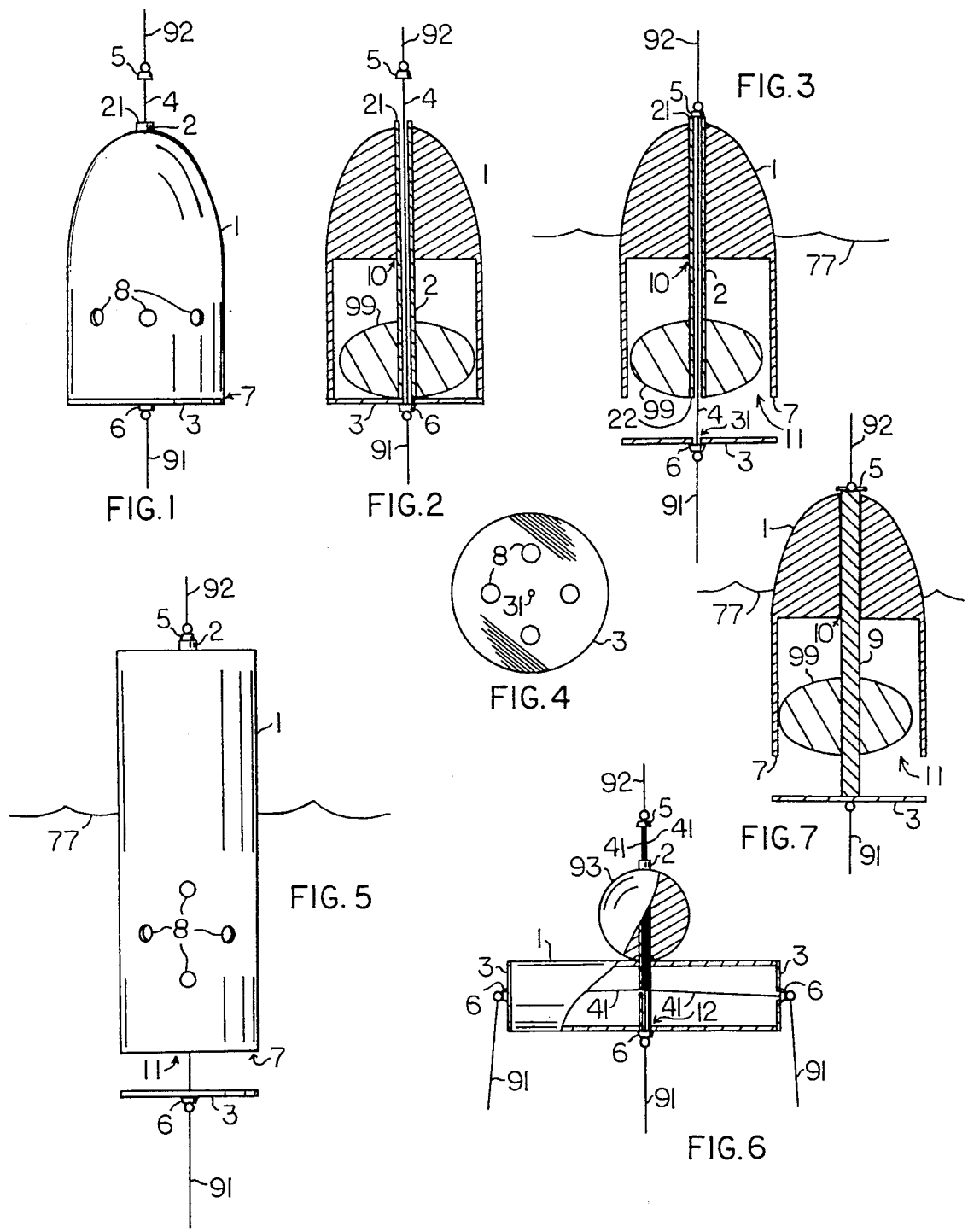

FISHING DEVICE

BACKGROUND OF THE INVENTION

The invention relates generally to the field of fishing devices known as bobbers or floats, which are attached to a fishing line and float on the surface of the water. Bobbers are used to set the depth of the hook and to indicate when a strike has been made by a fish. More particularly, the invention relates to fishing bobbers which also release bait or chum into the water.

It is a common practice when fishing for certain fish to attract the fish to the area of the fishing hook or hooks by chumming the water. Chumming is the practice of dispersing fish meal or other fish food or attractant into the water, usually by hand. The fisherman throws an amount of chum into the water and then attempts to cast his hook into the same area, or vice versa. This method can be effective in attracting the fish, but requires accuracy in throwing and casting, and suffers from the drawback of wind or water currents moving the chum away from the hook.

To solve this problem, devices have been developed which allow the fisherman to disperse the chum from either the lure itself or a bobber. The chum is inserted inside the device prior to casting. Upon the device entering the water, the chum is released by various mechanisms so that the chum is concentrated in the vicinity of the hook or hooks on the fishing line.

Examples of chum releasing bobbers are known in the art. Lueck, in U.S. Pat. No. 3,780,467, teaches a bobber having a relatively long tubular stem on which is mounted a fixed lower hemispherical container and a slidable, apertured upper hemispherical container which is slightly larger than the lower hemisphere. To use the device, the chum is placed in the bottom hemisphere and the upper hemisphere is positioned to enclose the chum. The size of the apertures is determined by the distance separating the two hemispheres. The fishing line is inserted through the tubular stem and the hook is attached. The fishing rig is then cast into the water, where the bobber floats on the surface and releases chum through the apertures. The bobber floats on its side and chum is released by tugging on the line. Problems with this device are that the bobber rests on its side and therefore does not provide a good visual indication of a fish strike, and that the release of the chum is dependent on the amount of wave action or requires tugging by the fisherman.

Another example of a fishing bobber which acts to release chum is given by Muko in U.S. Pat. No. 4,065,870. This bobber is a bell shaped container having a hinged bottom lid. The bottom lid is maintained in a closed position during casting by various structural devices utilizing a pressure fit or slight mechanical connection. To open the bottom lid, the fisherman must pull on the line, thus forcing water through apertures in the upper portion of the device which creates enough pressure to release the bottom lid. This device as well suffers from the necessity for the fisherman to jerk the line, and further suffers from the drawback that over time the mechanisms used to maintain the bottom lid in the closed position will weaken and eventually fail.

This invention comprises a structure which does not suffer from the problems of the prior devices, whereby the chum is immediately released upon the bobber entering the water without recourse for any line action by the fisherman. The invention allows for variable rates of release due to its several embodiments.

SUMMARY OF THE INVENTION

The device comprises in general a hollow container, a closure lid to seal off the container, a tube extending through the container, and a line member contained within the tube and attached to the closure lid. The line member extends beyond the end of the tube and the hollow container and culminates in stopper means for joining the device to a fishing line. The length of the line member from the stopper means to the closure lid is greater than the overall length of the hollow container, whereby the line may move axially within the tube so that the closure lid can be separated from the hollow container. Stopper means are also provided on the exterior of the closure lid for attachment of the fishing line or leaders containing the fishing hook or hooks.

To use the device, the fisherman pulls the closure lid away from the hollow container and inserts the chum. In casting the device, the tension of the cast maintains the closure lid tightly against the hollow container. Upon striking the water, the bobber floats and the weighted fishing line with the hook separates the closure lid from the hollow container, the extra length of the line member within the tube allowing this separation to occur. The length of the line member relative to the overall length of the hollow container determines the separation distance and thus the rate of release of the chum into the water. Additionally, apertures may be placed in the closure lid or in the hollow container to increase dispersion of the chum.

BRIEF DESCRIPTION OF THE DRAWINGS

FIG. 1 is a side view of a preferred embodiment of the invention, shown in the closed or casting position.

FIG. 2 is a cross-sectional view of FIG. 1.

FIG. 3 is a cross-sectional view showing the device of FIG. 1 in the open or release position in the water.

FIG. 4 is a view of the closure lid, showing the addition of apertures.

FIG. 5 is a side view of an alternative embodiment of the invention.

FIG. 6 is a side view of still another embodiment of the invention, showing two closure lids.

FIG. 7 is a cross-sectional view of still another embodiment of the invention, where the line member is a solid rod.

DETAILED DESCRIPTION OF THE INVENTION

A preferred embodiment of the invention is illustrated in FIGS. 1, 2 and 3. The device mainly comprises a hollow main body container 1, tube 2, closure lid 3, line member 4, and line member stopper 5. Main body 1 is preferably an aerodynamically shaped container having a large open inner area to receive an amount of fishing chum 99. Main body 1 is substantially a closed container except for a main opening 11 defined by seating rim 7 and an axial tubular opening 10. Seating rim 7 forms a planar, peripheral surface to make continuous contact with closure lid 3, whose periphery is equal to or greater than that of seating rim 7. There is no interlocking mechanism or structure to attach closure lid 3 to seating rim 7, the closure lid 3 simply fits against seating rim 7. Main body 1 is constructed of a material or incorporates a buoyant material which floats, such as plastic, cork, wood, etc. In use, main body 1 will extend a distance above the surface of the water 77 so that it will be visible to the fisherman as an indicator of any fish strike. For this reason, it is also preferable that the main body 1 be brightly colored to be better visible.

Tube 2 extends through main body 1 and is preferably located along an axis within the axial tubular opening 10 of main body 1 for proper balance in the water. The exterior end 21 of tube 2 extends a short distance from or is flush with the outer and uppermost portion of main body 1. Tube 2 preferably extends within main body 1 a distance such that its interior end 22 is even with seating rim 7. When closure lid 3 is seated against seating rim 7, closure lid 3 also contacts the interior end 22 of tube 2. This construction provides structural support by bracing the closure lid 3 and tends to center closure lid 3 on the main body 1 when the device is in the closed position. Additionally, having tube 2 extend the full length of main body 1 prevents the chum 99 from clogging and impairing the movement of line member 4 within tube 2.

Line member 4 is preferably a short length of wire, line, string, etc. which is slightly greater in length than the overall length of main body 1. Line member 4 can also be a rigid shaft, rod or tube attached directly to closure lid 3 and slidingly contained within tube 2 or within the space defined by main body 1 around tube 2, as seen in FIG. 7. Line member 4 is contained within tube 2 and is connected to closure lid 3 by direct attachment or by extending line member 4 through a central opening 31 in closure lid 3 and attaching a lid member stopper means 6. Lid member stopper means 6 may be a knot in the line member 4, a plug, a swivel connector or any other means to prevent movement of closure lid 3 beyond the stopper means 6. Preferably, closure lid stopper means 6 also provides means for attachment of the weighted hook line 91. The other end of line member 4 extends from the upper end of tube 2 and culminates in a line member stopper means 5, which can be a knot, plug, swivel connector or any other means which is of a size greater than the opening of tube 2. Preferably, line member stopper means allows for attachment of the casting line 92. Because line member 4 is of slightly greater length than the main body 1, the line member can slide axially within tube 2, thus allowing separation of closure lid 3 from seating rim 7.

The device is used by separating closure lid 3 from seating rim 7 by pulling on the weighted hook line 91. The extra length of line member 4 allows for this separation and a gap is created through which the fish chum 99 is inserted into the main body 1. In the pre-cast position, gravity causes the main body 1 to rest against the closure lid 3, maintaining the device in the closed position, as shown in FIGS. 1 and 2. When casting, the device will be propelled upper end first, with the casting line 92 pulling against line member 4, which in turn pulls closure lid 3 securely against seating rim 7 to maintain the chum 99 within the device until it hits the water. Upon hitting the water, the device rights itself with the closure lid 3 below the water surface 77 and the exterior end 21 of tube 2 extending upward into the air. The weighted hook line 91 then pulls line member 3 down into tube 2 while the buoyancy of main body 1 causes it to remain on the water surface 77, such that closure lid 3 is separated from main body 1 and the chum 99 is dispersed immediately into the water. The rate of chum 99 dispersal is a factor of the separation distance of closure lid 3 from seating rim 7, which is controlled by the overall length of line member 4. By shortening line member 4, the separation distance between closure lid 3 and main body 1 is smaller and dispersal is slower. By lengthening line member 4, the separation distance is greater and dispersal is faster.

To increase dispersal, it is also envisioned to have embodiments which have apertures 8 in either the closure lid 3, as shown in FIG. 4, or the main body 1, or both. These apertures 8 provide openings to allow greater water flow into the device and additional means of exit for the disintegrating chum 99.

As previous stated, it is preferable that the main body 1 have an aerodynamic shape. The shape should create lower resistance when casting and allow for upright floating with a good portion extending above the water surface. A torpedo or bullet shape is preferable, but the device may be bell-shaped, conical, pyramidal, etc. An alternative embodiment is shown in FIG. 5, where the main body is tubular.

Still another alternative embodiment is shown in FIG. 6. This embodiment represents a relatively non-aerodynamic shape, but the device still functions as before. In this embodiment the main body 1 is tubular, but is connected to a float means 93 such that the tube rests with its axis parallel to the water surface 77 rather than perpendicular. There will therefore be two main openings 10, two seating rims 7 and two closure lids 3. Line member 4 has two secondary line members 41 which are connected on one end to the line member stopper 5 and on the other end to closure lids 3 along with corresponding lid stopper means 6. Tube 2 extends through a side opening 12 of the tubular main body 1 and the weighted hook line 91 is connected to the bottom end of line member 4 with a stopper means 6 as before. The device works as before, in that when the line is taut, the closure lids 3 are pulled tightly against the seating rims 7 of the tubular main body 1. When the device is floating in the water, the weighted hook line 91 pulls line member 3 downward, releasing the closure lids 3 and the chum 99. Additional hook lines 91 may also be attached to the two lid stopper means 6 if desired. Of course, other body shapes operating on this same principle with multiple closures can be envisioned.

Still another embodiment is shown in FIG. 7. Here a shaft or rod member 9 is substituted for line member 4. Shaft 9 is attached directly to closure lid 3 and slides axially within tube 2, or as shown in the figure, tube 2 can be removed and shaft 9 will slide in the tubular opening 10 in main body 1. The operating principle is the same, in that closure lid 3 will remain tightly against seating rim 7 until the device is cast into the water, where the buoyancy of main body 1 and the downward pull of hook line 92 will separate closure lid 3 from main body 1. Again, the overall length of shaft 9 or the placement of stopper member 5 will determine the amount of separation.

The above examples are by way of illustration only, and it is envisioned that substitutions and equivalents will be obvious to those skilled in the art. The full scope and definition of the invention is to be as set forth in the following claims.

I claim:

1. A floating fishing bobber adapted to be connected to a casting line and a hook line, comprising:
   a buoyant main body forming a container for fishing chum, said main body having a tubular opening, a main opening, and a peripheral seating rim surrounding said main opening;

a closure lid adapted to seat on said seating rim to close said main opening, said closure lid being separable from said seating rim;

a line member extending through said tubular opening and said main opening of said main body, said line member being connected to said closure lid, said line member being axially moveable within said tubular opening; and a line member stopper means connected to said line member, where said line member stopper means and said closure lid together maintain said line member within said main body.

2. The device of claim 1, further comprising a tube inserted in said tubular opening of said main body, where said line member is contained within said tube.

3. The device of claim 2, where said tube extends to a distance even with said seating rim whereby said closure lid contacts said tube when said closure lid is seated on said seating rim.

4. The device of claim 1, where said line member is a rigid shaft.

5. The device of claim 1, where said hook line is connected to said closure lid and said cast line is connected to said line member stopper means.

6. The device of claim 1, further comprising closure lid stopper means connecting said line member to said closure lid.

7. The device of claim 6, where said hook line is connected to said closure lid stopper means and said cast line is connected to said line member stopper means.

8. The device of claim 2, further comprising closure lid stopper means connecting said line member to said closure lid.

9. The device of claim 8, where said hook line is connected to said closure lid stopper means and said cast line is connected to said line member stopper means.

10. The device of claim 1, further comprising apertures in said closure lid.

11. The device of claim 1, further comprising additional apertures in said main body.

12. The device of claim 2, further comprising apertures in said closure lid.

13. The device of claim 2, further comprising additional apertures in said main body.

14. The device of claim 1, further comprising a second main opening, a second peripheral seating rim, a second closure lid and a second line member.

15. The device of claim 14, further comprising a side opening in said main body, a third line member and a third stopper means, where said third line member extends through said side opening and is connected to said third stopper means.

16. The device of claim 15, where said hook line is connected to said third stopper means and said cast line is connected to said line member stopper means.

* * * * *